United States Patent
McLeod

(10) Patent No.: US 11,744,260 B2
(45) Date of Patent: Sep. 5, 2023

(54) METHOD OF PRODUCING NATURALLY WOOD SMOKED CHEESE

(71) Applicant: Hilmar Cheese Company, Hilmar, CA (US)

(72) Inventor: Jeremy McLeod, Turlock, CA (US)

(73) Assignee: HILMAR CHEESE COMPANY, Hilmar, CA (US)

( * ) Notice: Subject to any disclaimer, the term of this patent is extended or adjusted under 35 U.S.C. 154(b) by 0 days.

(21) Appl. No.: 15/588,139

(22) Filed: May 5, 2017

(65) Prior Publication Data
US 2017/0290351 A1    Oct. 12, 2017

Related U.S. Application Data

(63) Continuation-in-part of application No. 15/092,380, filed on Apr. 6, 2016, now abandoned.

(51) Int. Cl.
  *A23C 19/068* (2006.01)
  *A23C 19/064* (2006.01)
  *A23C 19/09* (2006.01)

(52) U.S. Cl.
  CPC .......... *A23C 19/068* (2013.01); *A23C 19/064* (2013.01); *A23C 19/0925* (2013.01)

(58) Field of Classification Search
  CPC .. A23C 19/068; A23C 19/064; A23C 19/0925
  USPC .............................. 426/34, 36, 580, 582, 442
  See application file for complete search history.

(56) References Cited

U.S. PATENT DOCUMENTS

| | | | | |
|---|---|---|---|---|
| 2,813,028 A | * | 11/1957 | Jackson, Jr. | A01J 25/112 426/36 |
| 3,462,282 A | * | 8/1969 | Fessmann | A23B 4/0523 426/312 |
| 3,503,760 A | * | 3/1970 | Allen | A23B 4/0526 426/312 |
| 2011/0151071 A1 | * | 6/2011 | Ablett | A23L 3/3418 426/129 |
| 2014/0057027 A1 | * | 2/2014 | Ablett | A23L 27/27 426/314 |

FOREIGN PATENT DOCUMENTS

| | | |
|---|---|---|
| RU | 2124296 C1 | 1/1999 |
| RU | 102294 U1 | 2/2011 |
| SU | 1732905 A1 | 5/1992 |

OTHER PUBLICATIONS http://ronkulas.proboards.com/thread/303/smoked-cheese-cold-smoking, 2014.*
http://goldenagecheese.blogspot.com/2010/12/how-does-one-smoke-cheese.html, 2010.*
http://blog.cheesemaking.com/smoking-your-cheese/, 2010.*
Kosikowski, F., Cheese and Fermented Milk Foods, 1977, second edition, Edwards Brothers Inc., pp. 90-108 and 259.*
International Search Report and Written Opinion dated Jul. 20, 2017, in Application No. PCT/US17/26336.
Final Office Action dated May 14, 2019, U.S. Appl. No. 15/092,380, "Naturally Wood Smoked Cheese," filed Apr. 6, 2016.
International Preliminary Report on Patentability dated Aug. 31, 2018, Appl. No. PCT/US2017/026336, filed Apr. 6, 2017.

* cited by examiner

*Primary Examiner* — Leslie A Wong
(74) *Attorney, Agent, or Firm* — Ramey LLP

(57) ABSTRACT

A smoked block of cheese is prepared by exposing the curds to smoke. The smoked block of cheese is evenly smoked and obtained in a shorter period of the time than is required to evenly smoke an entire block of cheese.

6 Claims, 1 Drawing Sheet

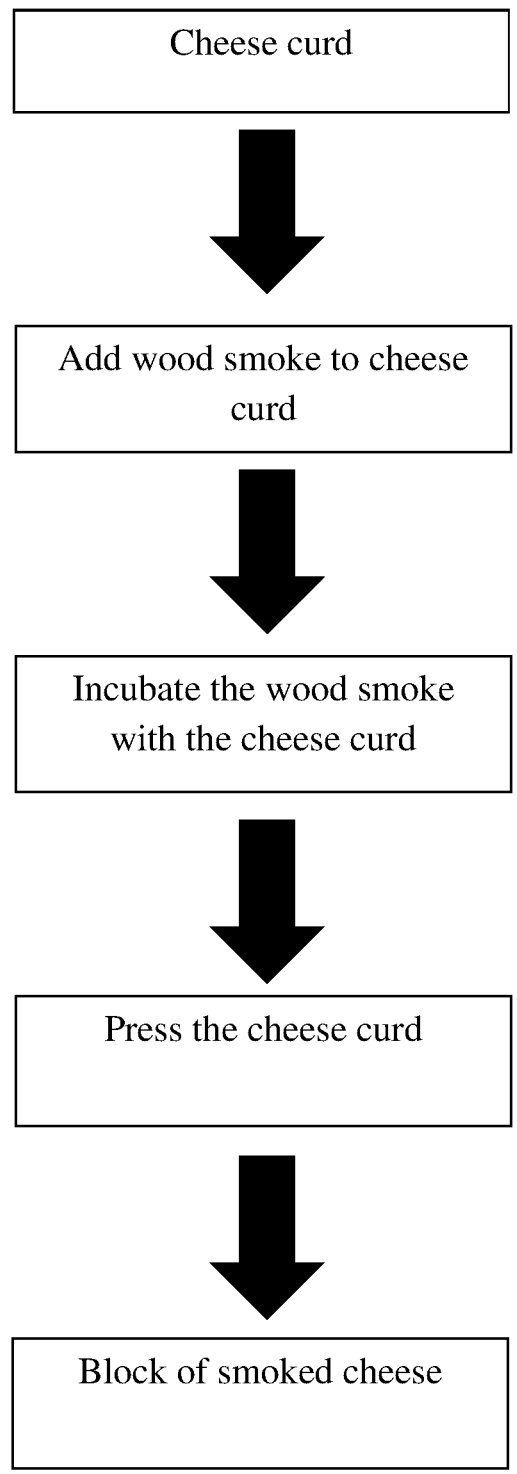

US 11,744,260 B2

METHOD OF PRODUCING NATURALLY WOOD SMOKED CHEESE

This application claims priority to U.S. patent application Ser. Number 15/092,380, filed Apr 6, 2016, now abandoned, herein incorporated by reference in its entirety.

FIELD

The disclosure relates generally to food production. The disclosure relates specifically to cheese production.

BACKGROUND

Smoked cheese blocks have been traditionally formed in cold smoke houses. However, it takes a long period of exposure to the smoke to develop an evenly smoked cheese. It can take days in the smoke house for the block of cheese to become evenly smoked. Alternatively, liquid smoke can be applied to the cheese but this results in the cheese being smoke-flavored, not smoked.

It would be advantageous to have a mechanism of smoking cheese that provides an evenly smoked cheese in a shorter period of time.

SUMMARY

An embodiment of the disclosure is a method of producing a block of smoked cheese comprising producing cheese curd; adding wood smoke to cheese curd at a ratio of 0.001 to 1 m 3 of wood smoke to 1 kg of cheese curd; incubating the wood smoke with the cheese curd at temperature range of 4 to 55° C.; and pressing the cheese curd to form a block of smoked cheese. In an embodiment, the block of smoked cheese is evenly smoked. In an embodiment, the strength of the smoked flavor within the block of smoked cheese is within +/−10% at any location sampled from the block of smoked cheese. In an embodiment, the strength of the smoked flavor is determined by at least one selected from the group consisting of sensory evaluation by a panel and chemical test. In an embodiment, the wood smoke is produced by burning a wood selected from the group consisting of at least one of applewood, maple, hickory, mesquite, cherry and Manuka. In an embodiment, the cheese curd is incubated with the wood smoke for 1-600 seconds. In an embodiment, the cheese curd is produced by the method comprising subjecting at least one selected from the group consisting of milk, nonfat milk, and cream, to the action of a lactic acid-producing bacterial culture; adding at least one clotting enzyme to the ingredients to set them into a semisolid mass; cutting the semisolid mass; stirring the semisolid mass; heating the semisolid mass with continued stirring to cause separation of whey and curd; draining off the whey; matting the curd into a cohesive mass to create a milled curd; allowing the cohesive mass to set; cutting the cohesive mass into pieces by milling; salting the curd; stirring the curd; and draining the curd. In an embodiment, the method further comprises adding at least one inclusion to the salted curd.

In an embodiment, the method further comprises adding calcium chloride to the dairy ingredients as a coagulation aid. In an embodiment, the clotting enzymes are of animal, plant, or microbial origin. In an embodiment, the cheese curd is produced by the method comprising subjecting at least one selected from the group consisting of milk, nonfat milk, and cream to the action of a lactic acid-producing bacterial culture; adding at least one clotting enzyme to the ingredients to set them into a semisolid mass; cutting the semisolid mass; stirring the semisolid mass; heating the semisolid mass with continued stirring to cause separation of whey and curd; draining off the whey; stirring continually to create a stirred curd; salting the curd; stirring the curd; and draining the curd. In an embodiment, the method further adding at least one inclusion to the salted curd. In an embodiment, the method further comprises adding calcium chloride to the dairy ingredients as a coagulation aid. In an embodiment, the cheese curd is pressed to form the block of smoked cheese. In an embodiment, the block of smoked cheese is about 640 pounds. In an embodiment, the block of smoked cheese is about 40 pounds. In an embodiment, the block of smoked cheese is about 5 pounds.

An embodiment of the disclosure is a smoked cheese block produced by the method above. In an embodiment, the block of smoked cheese is about 640 pounds. In an embodiment, the strength of the smoked flavor within the block of smoked cheese is evenly distributed at time of pressing.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIG. 1 depicts a flowchart of a method of producing a block of smoked cheese.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "cohesive mass" means and refers to a group of curds adhering together.

In an embodiment, a natural wood smoke can be added to cheese curd prior to pressing the curd into a block format. This is done to overcome the issues with smoking after the block has formed. The primary issues being double handling of the cheese, a need to convert blocks to a smaller size to allow smoke to penetrate into the cheese easily and the need for days of exposure to smoke to allow an even development of smoke in the cheese block. This method provides a process for easily and rapidly adding wood smoke to the cheese at the primary manufacturing point. It also allows for the creation of evenly smokes large blocks of cheese. In an embodiment, the cheese blocks can be 5 pounds, 40 pounds, or 640 pounds.

During a prolonged period of smoking a cheese block, the outside of the cheese can become discolored.

Cheese is made from milk, nonfat milk, or cream, used alone or in combination. These ingredients are subjected to the action of a lactic acid-producing bacterial culture, with rennet and/or other clotting enzymes of animal, plant, or microbial origin added to the ingredients to set them into a semi-solid mass. The mass is cut, stirred, and heated with continued stirring, as to promote and regulate the separation of whey and curd. The whey is drained off. The curd is either 1) matted into a cohesive mass to allow the creation of a milled curd or 2) continually stirred to prevent matting to create a stirred curd. Where the cohesive mass has been allowed to set, it is then cut into pieces by milling to form a milled curd. In both cases the curd is salted, stirred, further drained, and pressed into forms. Coloring may be added to the milk to change the cheese color. Calcium chloride may be added to the dairy ingredients as a coagulation aid.

In an embodiment, the cheese is continually stirred during smoking to allow the even application of smoke and to prevent the curd knitting during the smoking process. In an embodiment, an auger can be used to stir and move the curd, allowing for continuous smoking and through varying the auger speed, variable residence time of the curd.

In an embodiment, cheese curds can be smoked by applying smoke to the conveying and draining systems as curds are moved through the process steps. In an embodiment, cheese curds can be smoked on a belt. In an embodiment, the smoke can be applied to the belt system while the curd is stirred. In an embodiment, a vacuum can be used to retain smoke in the smoking system. This allows for the direction and residence time of the smoke to be controlled. The ability to control the mass of the smoke added and the cheese curd contact time with the smoke allows for manipulation of the smoke intensity in the cheese.

In an embodiment, after salting of the smoked curd, inclusions can be optionally added to the smoked curd. In an embodiment, the one or more inclusions can include but are not limited to meats, fruits, vegetables, legumes, tree nuts, seeds, herbs, spices, alcoholic substances, or flavorings. In an embodiment, the one or more inclusions can include but are not limited to bacon, pepperoni, salami, ham, jalapeno peppers, habanero peppers, serrano peppers, green peppers, red peppers, almonds, peanuts, truffles, mushrooms, tomatoes (sun-dried and otherwise), basil, oregano, olives, cranberries, berries, cherries, coffee beans, garbanzo beans, plums, peaches, chia seeds, coriander, grains, fungi, wasabi, or horseradish.

In an embodiment, cheese is made from milk, nonfat milk, cream, or a combination thereof.

In an embodiment, lactic acid-producing bacterial culture (LAB) is added to milk or cream as a defined or undefined starter culture. The LAB is added to cause acidification of the milk. This process can be referred to as ripening. This aids in coagulation of the milk. In an embodiment, the starter culture can comprise lactococcus, streptococcus, lactobacillus, leuconostoc, brevibacterium, and propionibacterium. In an embodiment, the culture may contain microorganisms that are not LAB.

Rennet and/or other clotting enzymes can be used to curdle the casein in milk. Rennet is a complex of enzymes. It is present in the stomachs of young mammals to help them digest milk. There are four major types of rennet: calf rennet, microbial rennet, fermentation produced chymosin (FPC), and vegetable rennet. Chymosin, a protease, is the key component of rennet. Another key component is pepsin. Rennet can be added to separate milk into solid curds. The milk is coagulated by the rennets. In an embodiment, the rennet and/or other clotting enzymes are derived from microbial sources. In an embodiment, the microbially-derived rennet and/or other clotting enzymes are FPC. FPC is produced by fermentation of a genetically modified microorganism (GMO). The chymosin expressed by the genetically modified organism is almost identical to the animal source. In an embodiment, both bovine and camel chymosin are used as milk-clotting enzymes manufactured under the disclosed conditions. In an embodiment, the rennet and/or other clotting enzymes of microbial source are of fungal origin. In an embodiment, the rennet and/or other clotting enzymes of microbial source are obtained from Rhizomucor miehei or pusillus. The rennet and/or other clotting enzymes obtained from Rhizomucor miehei or pusillus are not genetically modified and therefore can be used in markets where GMO-derived coagulants are not allowed. In an embodiment, any coagulant/rennet that functions to curdle the milk can be utilized.

In an embodiment, a method of producing a block of smoked cheese comprises producing cheese curd; adding wood smoke to cheese curd at a ratio of 0.001 to 1 $m^3$ of wood smoke to 1 kg of cheese curd; incubating the wood smoke with the cheese curd at temperature range of 4 to 55° C.; and pressing the cheese curd to form a block of smoked cheese. (FIG. 1)

In an embodiment, the temperature of the wood smoke is controlled to enable the desired flavor profile to be produced during the combustion process. This method allows an evenly smoked cheese to be obtained in a shorter period of time than required to smoke a block of cheese. In an embodiment, the curds can be cold-smoked or hot-smoked.

In an embodiment, evenly smoked is defined as the strength of the smoked flavor within the block of smoked cheese is within +/−10% at any location sampled from the block of smoked cheese. In an embodiment, the strength of the smoked flavor is determined by at least one selected from the group consisting of sensory evaluation by a panel and chemical test.

In an embodiment, the pressure used to press the cheese can be any pressure suitable to form the desired result.

Types of wood include but are not limited to applewood, maple, hickory, mesquite, cherry and Manuka. The type of wood used for smoking can affect the flavor of the cheese.

Milled curd is formed by cutting the matted curds. The curds are matted into a cohesive mass. When the cohesive mass has been allowed to set, it is then cut into pieces by milling to form a milled curd.

In a stirred curd, the curds are continually stirred to prevent matting.

In an embodiment, the size of the blocks formed from pressing the curds can be 640 pounds, 40 pounds, 5 pounds, or any other requested size. In an embodiment, a block refers to including but not limited to a cube, cuboid, rectangular prism, wheel, sphere, and cylinder.

In an embodiment, the strength of smoke flavor of the smoked cheese and other characteristics of the cheese can be determined by at least one of the group consisting of sensory evaluation by a panel of tasters, a chemical assay, and a microbiological assay.

In an embodiment, the smoked cheese can be aged. In an embodiment, the cheese can be aged for a period ranging from 1 day to 15 years.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of producing smoked cheese comprising the following steps:
   (a) adding wood smoke to a cheese curd at a ratio of 0.001 $m^3$ to 1 $m^3$ of wood smoke to 1 kg of cheese curd,
   (b) incubating the wood smoke and the cheese curd to produce a stirred curd, wherein incubating comprises smoking the cheese curd while stirring the cheese curd continuously, wherein stirring the cheese curd prevent matting of the cheese curd,
   (c) pressing the stirred curd obtained into a desired shape, and
   (d) allowing the stirred curd pressed into a desired shape from step (c) to age for 1 day to 15 years to obtain smoked cheese,
   wherein the smoked cheese comprises a strength of smoke flavor within +/−10% at any location sampled from the desired shape of the smoked cheese.

2. The method of claim 1, wherein the wood smoke is produced by burning a wood selected from the group consisting of applewood, maple, hickory, mesquite, cherry and Manuka.

3. The method of claim 1, wherein the wood smoke is distributed evenly throughout the smoked cheese.

4. The method of claim 1 wherein the smoked cheese is about 640 pounds.

5. The method of claim 1 wherein the smoked cheese is about 40 pounds.

6. The method of claim 1 wherein the smoked cheese is about 5 pounds.

* * * * *